(12) United States Patent
Pedrini

(10) Patent No.: US 7,044,347 B1
(45) Date of Patent: May 16, 2006

(54) INTERLOCK ARRANGEMENT FOR AN EXTENDIBLE AND RETRACTABLE STABILIZER FOR USE IN A BICYCLE CARRIER

(76) Inventor: Fabio Pedrini, Via Zamboni 1/Scale-A, Piano-1, Interno-3, CAP 40125 Bologna (IT)

( * ) Notice: Subject to any disclaimer, the term of this patent is extended or adjusted under 35 U.S.C. 154(b) by 22 days.

(21) Appl. No.: 10/383,013

(22) Filed: Mar. 6, 2003

(51) Int. Cl.
*B60R 9/00* (2006.01)

(52) U.S. Cl. .................. 224/501; 224/924; 224/324; 224/570; 224/571; 224/537; 224/536; 224/325

(58) Field of Classification Search ................ 224/536, 224/501, 502, 533, 503, 504, 505, 506, 507, 224/508, 509, 924, 322, 324, 520, 521, 537, 224/325
See application file for complete search history.

(56) References Cited

U.S. PATENT DOCUMENTS

| | | | |
|---|---|---|---|
| 488,395 A | 12/1892 | Justice | |
| 529,827 A | 11/1894 | Fonda | |
| 556,789 A | 3/1896 | Walker | |
| 576,351 A | 2/1897 | Penfield | |
| 586,681 A | 7/1897 | Douglas | |
| 607,024 A | 7/1898 | Durfee et al. | |
| 615,264 A | 12/1898 | Du Pont | |
| 623,807 A | 4/1899 | Myers | |
| 1,179,823 A | 4/1916 | Greene | |
| 1,912,958 A | 6/1933 | Widener | |
| 1,977,734 A | 10/1934 | Monckmeier | |
| 2,179,163 A | 11/1939 | Roth | |
| 3,251,520 A | 5/1966 | Van Dyke et al. | |
| 3,529,737 A | 9/1970 | Daugherty | |
| 3,744,689 A | 7/1973 | Kjensmo | |
| 3,972,456 A | 8/1976 | Saffold | |
| 3,993,229 A | 11/1976 | Summers | |
| 4,088,253 A | 5/1978 | Saffold | |
| 4,125,214 A | 11/1978 | Penn | |
| 4,171,077 A | 10/1979 | Richard, Jr. | |
| 4,213,729 A | 7/1980 | Cowles et al. | |
| 4,345,705 A * | 8/1982 | Graber ...................... | 224/324 |
| 4,360,135 A | 11/1982 | Goble | |
| 4,403,716 A | 9/1983 | Carlson et al. | |
| 4,437,597 A | 3/1984 | Doyle | |
| 4,452,384 A * | 6/1984 | Graber ...................... | 224/314 |
| 4,524,893 A * | 6/1985 | Cole ......................... | 224/319 |
| 4,702,401 A * | 10/1987 | Graber et al. ............... | 224/536 |

(Continued)

FOREIGN PATENT DOCUMENTS

SE        97617        12/1939

(Continued)

*Primary Examiner*—Tri M. Mai
(74) *Attorney, Agent, or Firm*—Boyle, Fredrickson, Newholm, Stein & Gratz, S.C.

(57) ABSTRACT

A bicycle carrier includes a wheel support arrangement and a stabilizer engageable with a bicycle wheel, for maintaining the bicycle upright. The stabilizer includes an inner section and an extendible and retractable outer section. The inner section is pivotable throughout a range of positions, including an operating position. A releasable engagement arrangement selectively maintains the outer section in a predetermined position relative to the inner section. The inner section includes an interlock, which prevents engagement of the releasable engagement arrangement other than when the stabilizer is in the operative position, to ensure that the stabilizer is engaged with the bicycle in a desired position relative to the bicycle. The interlock provides a sensory indication when the stabilizer is in the operative position, and includes a manual actuator disengaging the releasable engagement arrangement to move the stabilizer away from the operative position.

26 Claims, 6 Drawing Sheets

U.S. PATENT DOCUMENTS

| | | |
|---|---|---|
| 4,815,638 A | 3/1989 | Hutyra |
| 4,823,997 A | 4/1989 | Krieger |
| 4,875,608 A | 10/1989 | Graber |
| 4,877,169 A | 10/1989 | Grim |
| 5,029,740 A | 7/1991 | Cox |
| 5,169,042 A | 12/1992 | Ching |
| 5,445,300 A * | 8/1995 | Eipper et al. ............... 224/496 |
| 5,497,927 A | 3/1996 | Peterson |
| 5,579,973 A | 12/1996 | Taft |
| 5,624,063 A | 4/1997 | Ireland |
| 5,692,659 A * | 12/1997 | Reeves ....................... 224/536 |
| 5,730,343 A | 3/1998 | Settelmayer |
| 5,794,828 A | 8/1998 | Colan et al. |
| 5,833,074 A | 11/1998 | Phillips |
| 5,845,828 A | 12/1998 | Settelmayer |
| 5,988,403 A | 11/1999 | Robideau |
| 6,010,048 A | 1/2000 | Settelmayer |
| 6,053,336 A | 4/2000 | Reeves |
| 6,089,430 A | 7/2000 | Mehls |
| 6,164,508 A | 12/2000 | van Veenen |
| 6,296,162 B1 * | 10/2001 | Englander et al. .......... 224/324 |
| 6,439,397 B1 * | 8/2002 | Reeves ........................ 211/17 |
| 6,460,743 B1 * | 10/2002 | Edgerly et al. ............. 224/324 |
| 6,761,297 B1 * | 7/2004 | Pedrini ....................... 224/519 |

FOREIGN PATENT DOCUMENTS

| | | |
|---|---|---|
| SE | 104714 | 6/1942 |

* cited by examiner

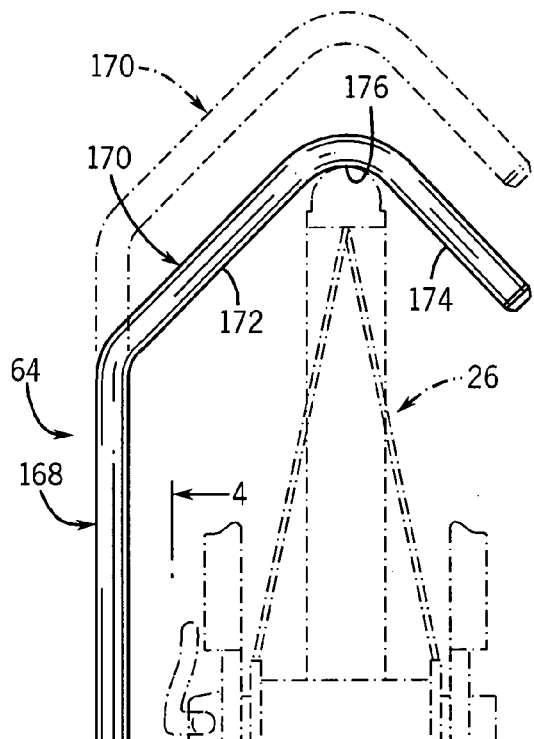
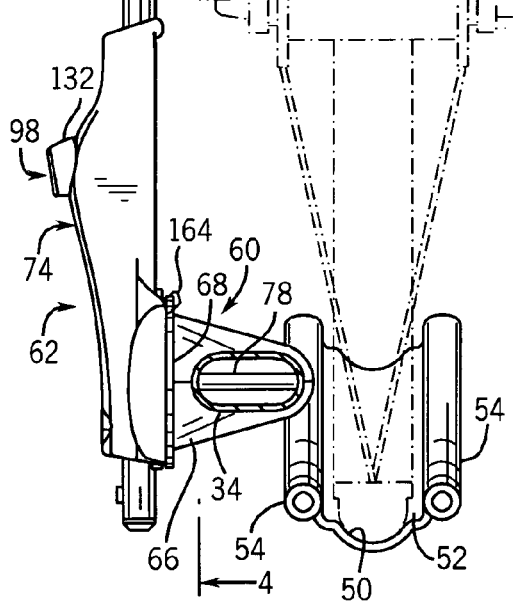
FIG. 3
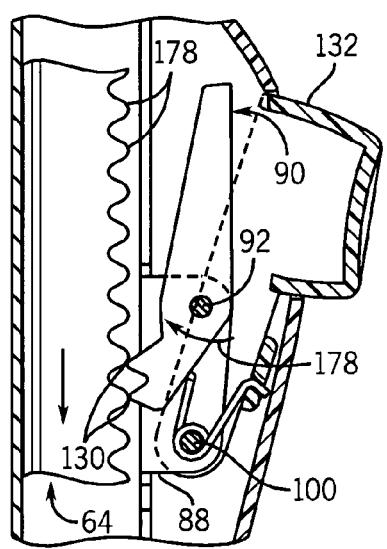
FIG. 10
FIG. 11

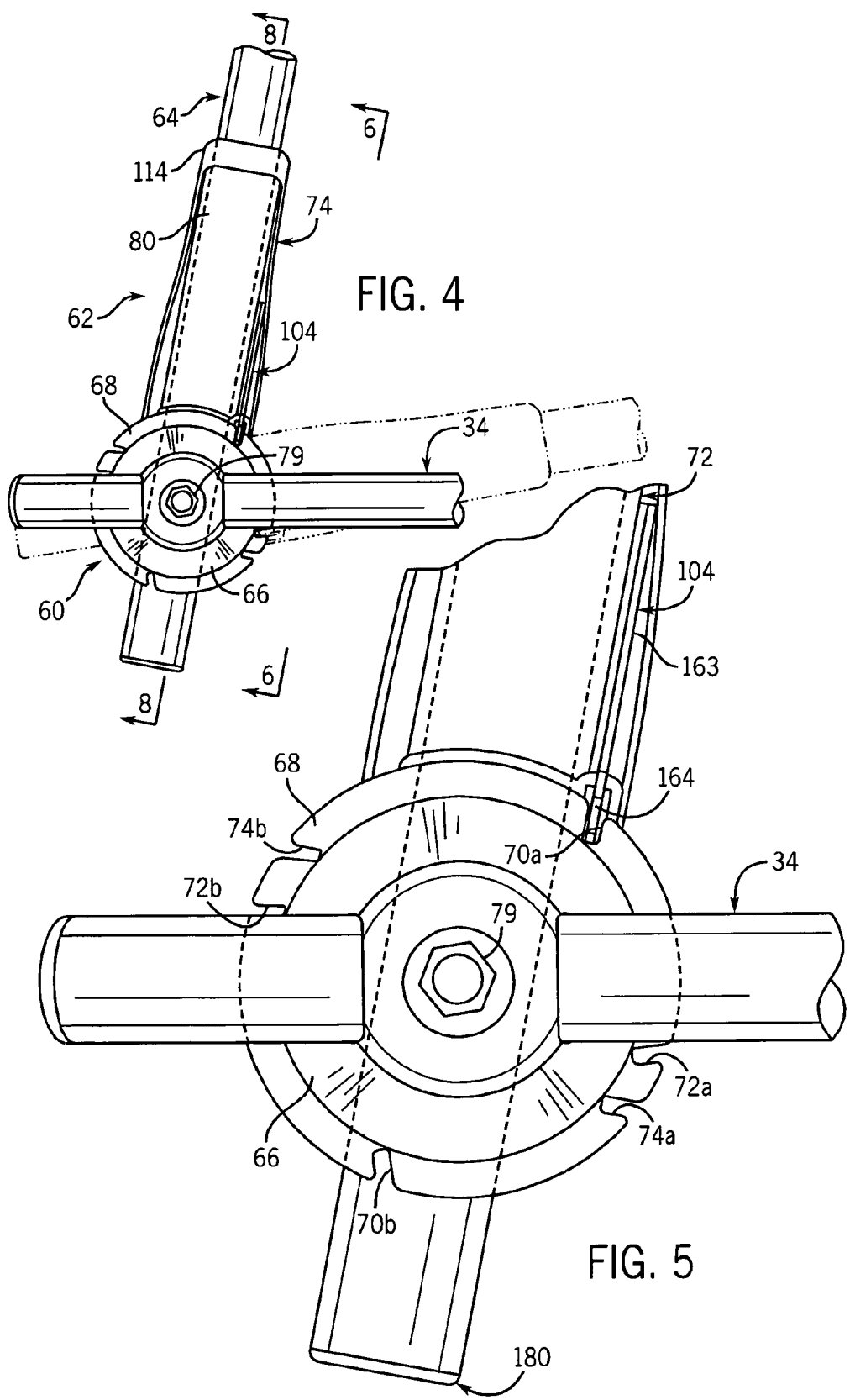

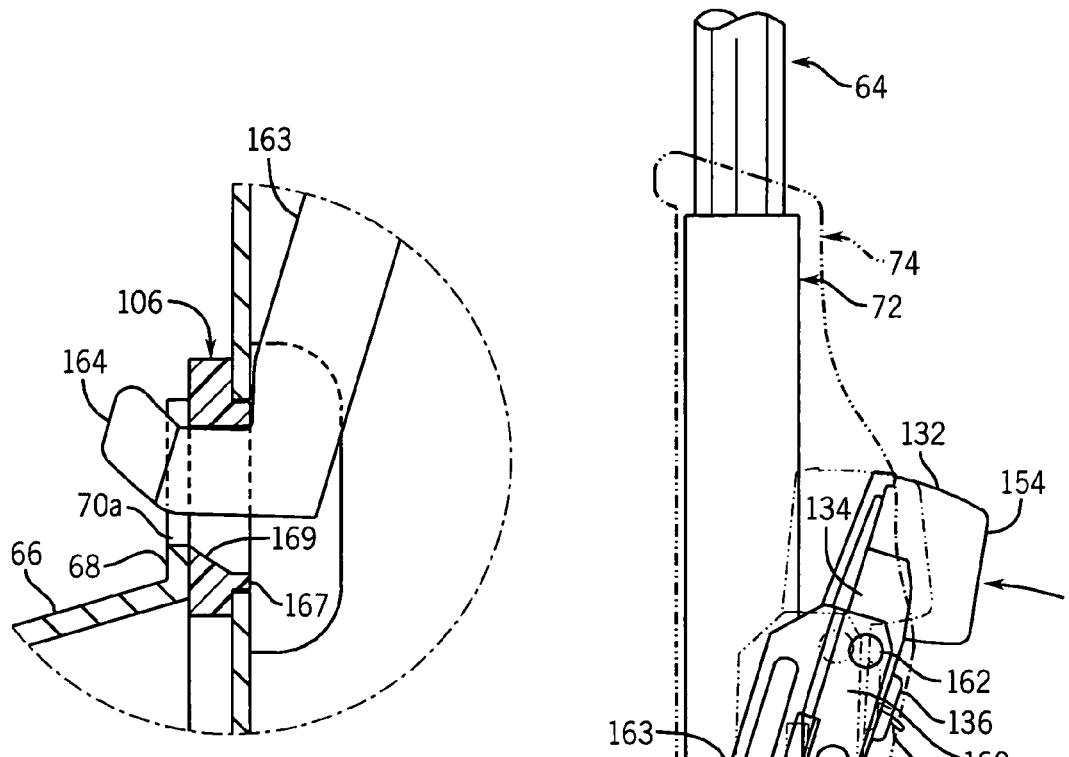
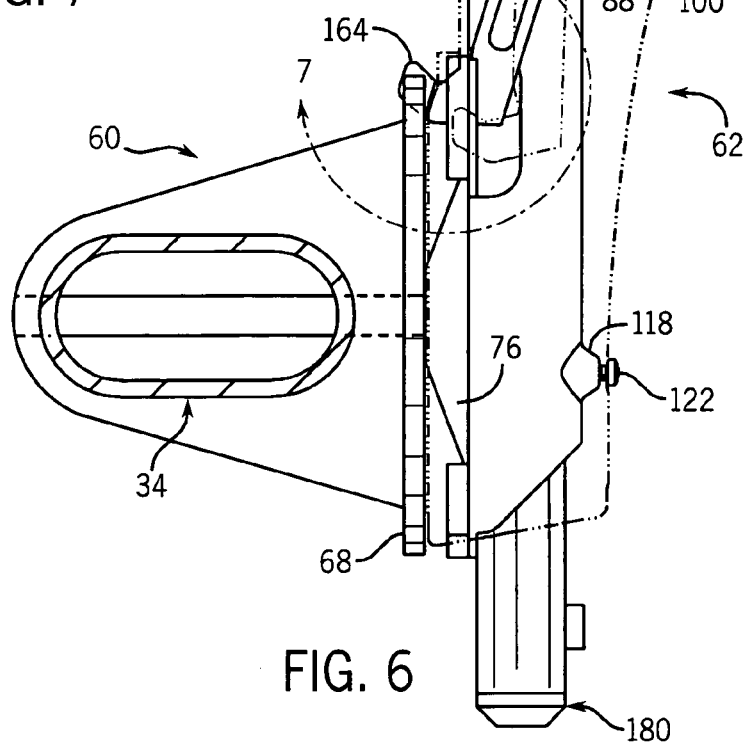
FIG. 7
FIG. 6

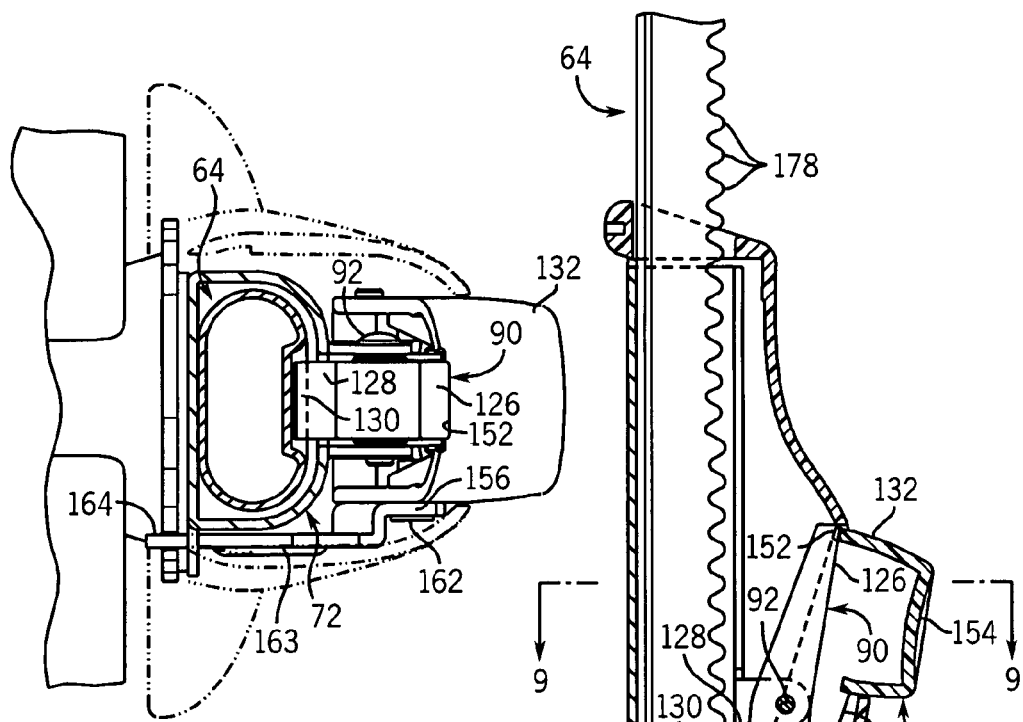
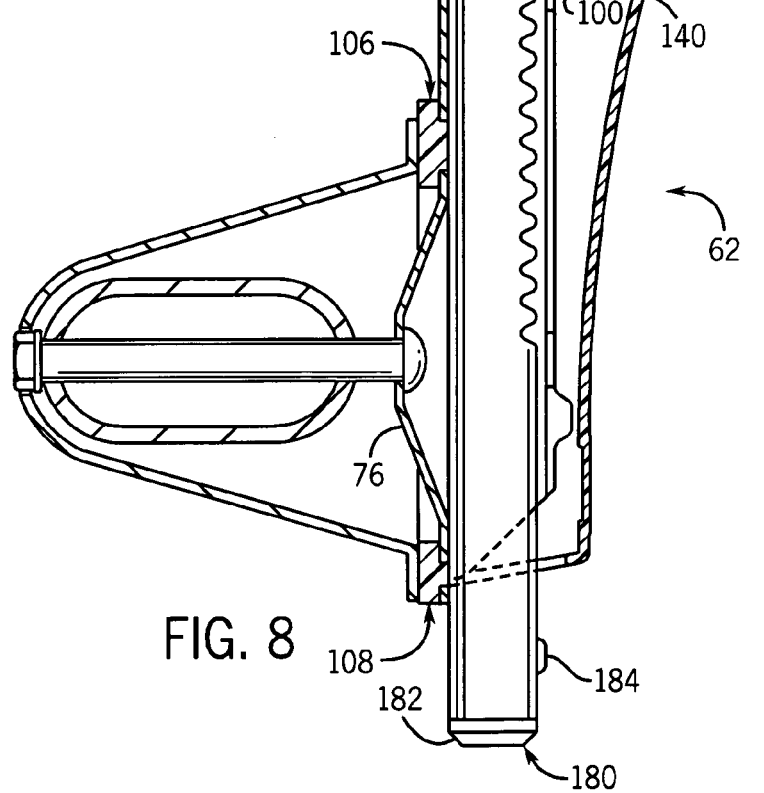
FIG. 9
FIG. 8

INTERLOCK ARRANGEMENT FOR AN EXTENDIBLE AND RETRACTABLE STABILIZER FOR USE IN A BICYCLE CARRIER

BACKGROUND AND SUMMARY OF THE INVENTION

This invention relates to a stabilizer such as is used in a vehicle-mounted bicycle carrier, and more particularly to an interlock arrangement for a pivotable stabilizer that includes an extendible and retractable outer section or arm.

A vehicle-mounted bicycle carrier typically includes a support arrangement for engaging one or both wheels of the bicycle. Fork-mount bicycle carriers require removal of one of the bicycle wheels, and include provisions for engaging the bicycle fork for maintaining the bicycle in an upright position during transport. While this type of carrier functions satisfactorily, it requires the user to remove the bicycle wheel for transport and to replace the bicycle wheel when preparing the bicycle for use.

A ride-ready bicycle carrier provides support for both of the bicycle wheels, which eliminates the need to remove and replace one of the bicycle wheels in order to transport the bicycle. This type of carrier includes a stabilizer, in the form or an extendible and retractable arm, for maintaining the bicycle in an upright position during transport. One example of a bicycle carrier of this type is shown and described in co-pending application Ser. No. 10/156,378 filed Aug. 23, 2001, the disclosure of which is hereby incorporated by reference. The carrier disclosed in the '378 patent application includes a frame adapted for mounting to the vehicle, and wheel supports for supporting the front and rear wheels of the bicycle. A stabilizing arm is pivotably interconnected with the frame for movement between a raised position and a lowered position. The stabilizing arm includes a base or inner section pivotably mounted to the frame, and an outer section that is extendible and retractable relative to the inner section. A ratchet-type engagement arrangement is interposed between the inner and outer sections of the stabilizing arm, to enable the outer section of the arm to be clamped onto the bicycle wheel so as to maintain the bicycle in an upright position.

It is an object of the present invention to provide a vehicle-mounted bicycle carrier which includes a feature for enabling the stabilizing arm to be engaged with an area of the bicycle, such as the bicycle wheel, only when the arm is in an operative position capable of maintaining the bicycle in an upright position during transport. It is a further object of the invention to provide such a bicycle carrier which operates in a generally similar manner to the carrier such as is disclosed in the '378 patent application, in which the stabilizing arm is capable of being engaged with the bicycle only when in an operative position that maintains the bicycle in an upright position. It is a further object of the invention to provide a stabilizing arm which provides a sensory indication to the user that the stabilizing arm is in an operative position and is capable of being engaged with the bicycle. Yet another object of the invention is to provide such a stabilizing arm which selectively prevents rotation and extension of the stabilizing arm when the stabilizing arm is engaged with the bicycle in an operative position. A still further object of the invention is to provide an interlock arrangement for an extendible and retractable stabilizer for use with a vehicle-mounted equipment carrier, as well as a method of operating a stabilizer in a bicycle carrier.

In accordance with the present invention, a bicycle carrier includes a wheel support configured to engage a lower area of a bicycle wheel, and a pivotable stabilizing arm configured to engage an upper area of the bicycle, so as to maintain the bicycle in an upright position on the carrier. The stabilizing arm includes a pivoting inner section or base, and an arm or outer section movably mounted to the inner section for movement between an extended position and a retracted position. The stabilizing arm further includes engagement structure interposed between the inner section and the outer section, including an engagement member that is movable between an engaged position and a release position. In the engaged position, the engagement member is operable to fix the position of the outer section relative to the inner section when the outer section is engaged with the bicycle. In the disengaged position, the engagement member allows extension of the outer section relative to the inner section. The stabilizing arm further includes a selectively actuable control or interlock arrangement interconnected with the movable engagement member. The control or interlock arrangement is operable to maintain the movable engagement member in the disengaged position when the stabilizing arm is in an inoperative position relative to the wheel support, and to move the engagement member to the engaged position when the stabilizer is in an operative position relative to the wheel support.

The engagement member may be mounted to the inner section, and the outer section may include a series of teeth with which the engagement member is engageable when in the engaged position, for fixing the position of the outer section of the relative to the inner section. In one form, the engagement member and the teeth provide ratchet-type engagement upon retraction of the outer section onto the upper area of the bicycle, such as the bicycle wheel. Movement of the engagement member to the disengaged position enables the outer section of the stabilizing arm to be extended relative to the inner section, to release engagement with the upper area of bicycle. The control or interlock arrangement includes an interlock member that is interconnected with the engagement member, and which maintains the engagement member in the disengaged position at all times other than when the stabilizer is in a predetermined operative position relative to the wheel support, such as a raised position or a lowered, stowed position. When the stabilizing arm is moved to an operative position, the interlock member is moved from a release position to an interlock position, and movement of the interlock member to the interlock position is operable to place the engagement member in the engaged position into engagement with the series of teeth. The outer section of the stabilizing arm is then retracted relative to the inner section into engagement with the upper area of the bicycle. The interlock arrangement further includes a manually operable actuator, which enables a user to manually move the engagement member from the engaged position to the disengaged position, to allow extension of the outer section of the stabilizing arm and thereby disengagement of the stabilizing arm from the upper area of the bicycle. Such movement of the engagement member to the disengaged position causes the interlock member to move from the interlock position to the release position, to enable the stabilizing arm to be pivoted relative to the wheel support.

The invention contemplates a bicycle carrier having a stabilizing arm, as well as a stabilizing arm construction and a method of operating a bicycle carrier, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a section view taken along line 3—3 of FIG. 1;

FIG. 4 is a partial elevation view, with reference to line 4—4 of FIG. 3, showing the inner and outer sections of the stabilizing arm of the present invention in a raised operative position;

FIG. 5 is an enlarged partial elevation view of the lower portion of the inner and outer sections of the stabilizing arm as shown in FIG. 4;

FIG. 6 is a partial section view taken along line 6—6 of FIG. 4;

FIG. 7 is an enlarged partial section view with reference to line 7—7 of FIG. 6;

FIG. 8 is a section view taken along line 8—8 of FIG. 4, showing the engagement member in an engaged position;

FIG. 9 is a partial section view taken along line 9—9 of FIG. 8;

FIG. 10 is an enlarged partial section view of the inner and outer sections of the stabilizing arm and the engagement member as in FIG. 8, showing the engagement member in a disengaged position; and FIG. 11 is a view similar to FIG. 10, showing the engagement member in an engaged position for providing ratchet-type engagement of the teeth of the outer section of the stabilizing arm upon retraction of the outer section.

DETAILED DESCRIPTION OF THE INVENTION

Figure 1:
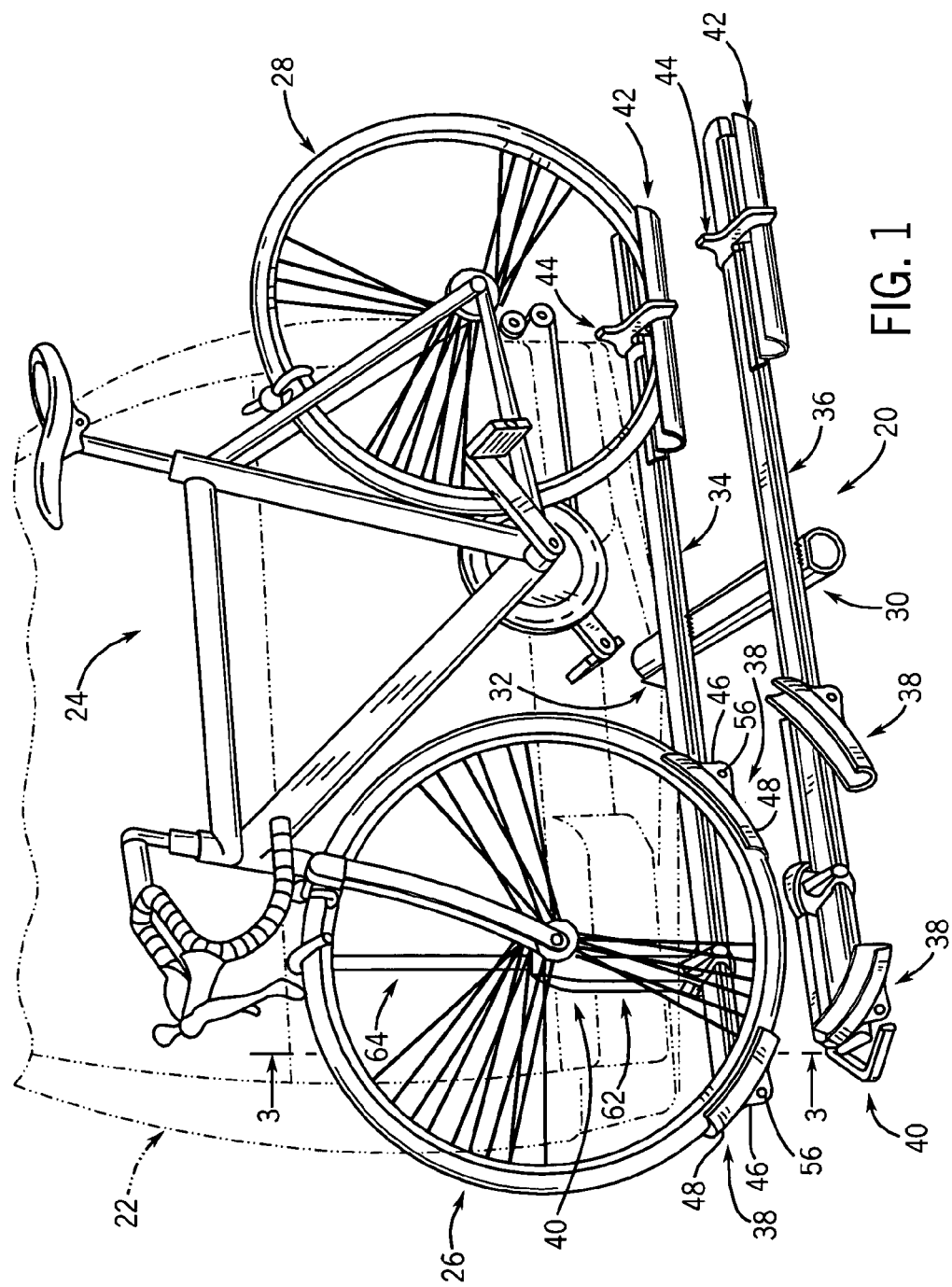
FIG. 1 is an isometric view illustrating a representative construction of a vehicle-mounted bicycle carrier having a stabilizing arm incorporating the interlock arrangement of the present invention.

FIG. 1 illustrates a bicycle rack or carrier 20 adapted for mounting to the hitch of a vehicle, shown at 22, for transporting a bicycle 24. Bicycle carrier 20 is adapted to carry bicycle 24 in a ride-ready fashion, and provides quick and easy mounting of bicycle 24 to carrier 20 and removal of bicycle 24 from carrier 20. In a manner to be explained, carrier 20 engages the front and rear wheels, shown at 26, 28, respectively, of bicycle 24 for retaining bicycle 24 in position on carrier 20.

Carrier 20 includes an axial central support member 30, in the form of a tubular member, which extends rearwardly from a hitch attachment mechanism 32 adapted for engagement with the trailer hitch of vehicle 22. Hitch attachment mechanism 32 may be in the form of a mounting bracket to which central support member 30 is connected for movement between an operative extended position as shown, and an inoperative stowed position in which central support member 30 is positioned in an upright orientation. Representatively, such a mounting bracket is illustrated in copending application Ser. No. 10/271,075 filed Oct. 15, 2002, the disclosure of which is herby incorporated by reference, although it is understood that any other satisfactory type of mounting mechanism may be employed.

Carrier 20 includes a pair of structural cross members 34, 36 secured to central support member 32 in any satisfactory manner such as by welding. Structural cross members 34, 36 are adapted to support a bicycle 24 in a manner to be explained. While carrier 20 is shown and described as having two (2) structural cross members for supporting two bicycles, it is understood that any number of structural cross members such as 34, 36 may be utilized to mount any desired number of bicycles, e.g. one, two, three, four or any other desired number. Further, while structural cross members 34, 36 are illustrated as being of one-piece construction extending outwardly from opposite sides of central support member 30, it is understood that each structural cross member may alternatively be two separate pieces extending outwardly from opposite sides of central support member 30.

Generally, each structural cross member, such as 34, of carrier 20 includes a pair of front wheel support members 38 and a stabilizing member in the form of a clamp or stabilizing arm mechanism 40 interconnected with structural cross member 34 on one side of central support member 30, in combination with a rear wheel support member 42 and a rear wheel retainer 44 interconnected with structural cross member 34 on the opposite side of central support member 30. A similar set of components is mounted to each additional structural cross member, such as 36, for use in mounting additional bicycles to bicycle carrier 20.

Each front wheel support member 38 includes a boss 46 and a wheel engagement member 48 which defines wheel engagement areas extending outwardly in opposite directions from boss 46. As shown in FIG. 3, each wheel engagement member 48 may be in the form of a trough having a relatively narrow outer portion 50 and a wide inner portion 52 bounded by tubular outer members 54. Each wheel engagement member 48 is arcuate in shape, and a pivot bolt 56 extends through a transverse passage formed in each boss 46 and through aligned openings formed in the walls of structural cross member 34. With this construction, each front wheel support member 38 is pivotable about a pivot axis defined by pivot bolt 56. Arcuate wheel engagement members 48 are adapted to engage a bicycle wheel such as front wheel 26 in the lower area of the wheel, and to support the wheel at spaced apart locations. The spacing between front wheel support members 38 as well as the length of engagement members 48 are selected such that front wheel support members 38 are capable of receiving and engaging all sizes of bicycle wheels, from the smallest juvenile bicycle to the largest adult bicycle. The narrowed outer trough portions 50 of support members 38 are adapted to receive narrower bicycle tires such as are found on racing or street bicycles, and the wide inner trough portions 52 are adapted to receive wider bicycle tires such as are found on juvenile and mountain bicycles.

Figure 2:
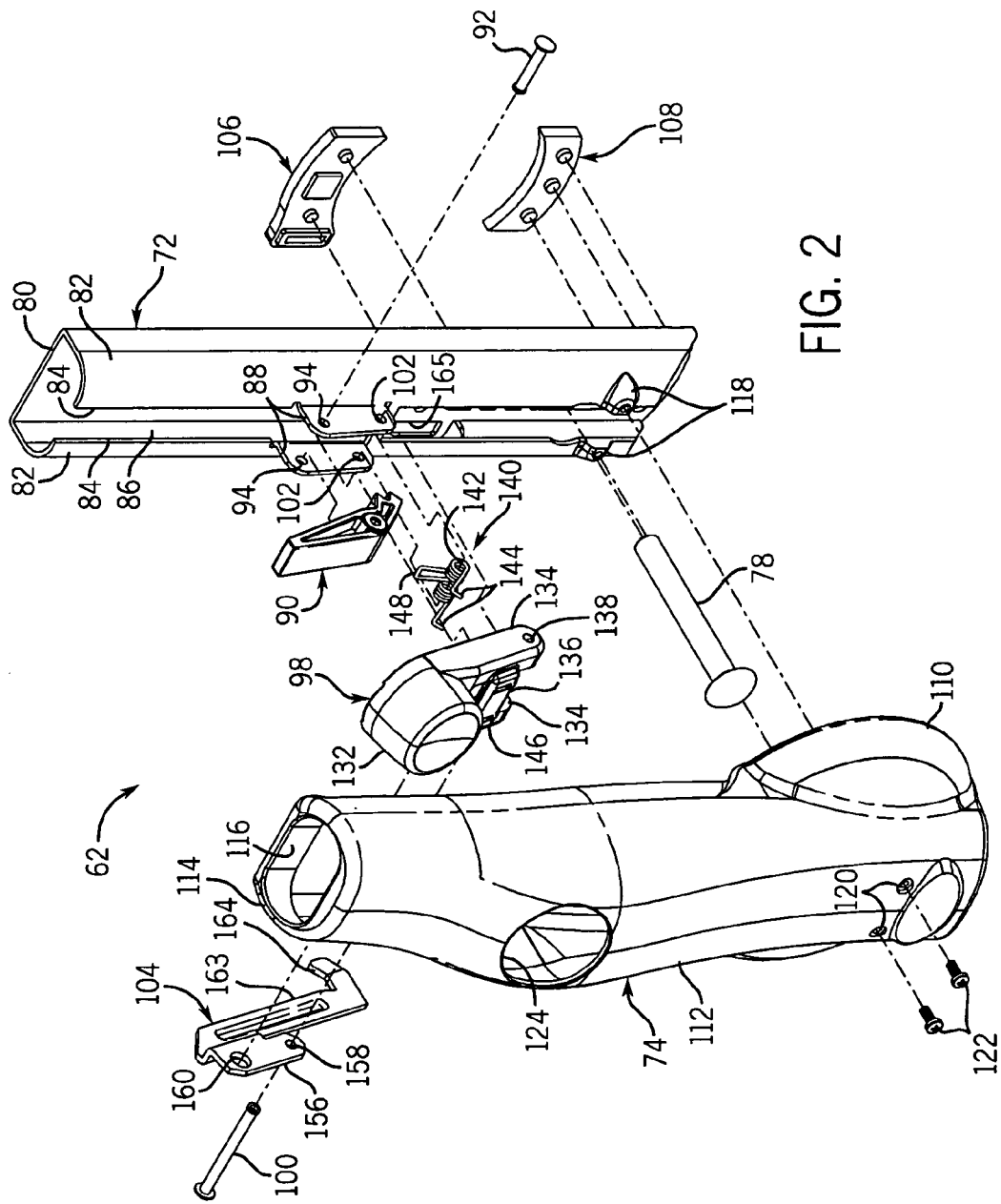
FIG. 2 is an exploded isometric view illustrating the components of an inner section of the stabilizing arm incorporated in the bicycle carrier of FIG. 1.

As shown in FIGS. 2–4, stabilizing arm 40 is pivotably mounted to a shell or hub 60 secured to structural cross member 34, stabilizing arm 40 functions as a stabilizer to engage an upper area of bicycle 24, such as the upper area of one of bicycle wheels 26, 28, to maintain bicycle 24 in an upright position during transport. Stabilizing arm 40 includes a base or inner section 62 pivotably mounted to hub 60, and an outer section 64 which is mounted for inward and outward movement to inner section 62. In a manner to be explained, stabilizing arm 40 is adapted to engage the upper portion of one of the bicycle wheels 26, 28 at a location between wheel support members 38, for clamping the wheel to structural cross member 34.

Referring to FIG. 3, hub 60 is in the form of a generally conical member having a side wall 66 that define a passage within which structural cross member 34 is received. Hub 60 further includes an outwardly facing outer ring 68 at the outer extent of side wall 66. A series of openings in the form of slots 70a, 72a and 74a are formed in one half of ring 68, and oppositely facing openings in the form of slots 70b, 72b and 74b are formed in the other half of ring 68.

Referring to FIGS. 2 and 6, inner section 62 of stabilizing arm 40 includes an inner tubular member in the form of an insert 72, in combination with a cover 74. Insert 72 defines a lower convex wall 76 having a central opening through which a pivot bolt 78 extends. Pivot bolt 78 further extends through aligned openings in the walls of structural cross member 34. Pivot bolt 78 includes a shank of having a threaded end, and a nut 79 engages the threaded end of the shank of pivot bolt 79 to mount inner section 62 to cross member 34. Pivot bolt 78 defines a pivot axis about which insert 72, and thereby inner section 62, is pivotable relative to hub 60 and cross member 34.

Insert 72 is in the form of a tubular stamped and rolled steel member having a generally D-shaped cross section. As shown in FIG. 2, insert 74 includes a rear wall 80 and a pair of arcuate side walls 82 extending outwardly therefrom. Each side wall 82 terminates in an end 84, and side wall ends 84 face each other to define an axially extending slot 86 therebetween. Approximately at the center of insert 72. An engagement member 90 is pivotably mounted between ears 88 via a pivot pin 92 that extends through a pair of upper openings 94 in ears 88.

In addition, an actuator 98 is mounted between ears 88 via a pin 100 that extends through aligned lower openings 102 formed in ears 88. A control or interlock member 104 is engaged with actuator 98, in a manner to be explained.

A pair of bearing members 106, 108 are engaged within openings formed in rear wall 80 of insert 72. Bearing members 106, 108 are formed of a low friction material, and are positioned to engage ring 68 so as to facilitate rotation of inner section 62 of clamp arm 40 relative to hub 60.

Cover 74 is configured to receive insert 72, and includes a lower hub area 110 having a configuration that matches the outer extent of hub 60. Cover 74 further includes a body section 112 extending upwardly from hub area 110, terminating in an upper end 114 that defines an opening 116 within which the upper end of insert 72 is received. The lower end of insert 72 includes a pair of mounting bosses 118, each of which defines a threaded opening. Mounting bosses 118 are adapted to be placed into alignment with a pair of openings 120 formed in the lower end of cover 74. Screws 122 extend through openings 120 into engagement with the openings in bosses 118, so as to secure insert 72 and cover 74 together. Body section 112 of cover 74 includes an opening 124.

Referring to FIG. 8, engagement member 90 includes an upper lever section 126 and a lower engagement section 128 having a pair of teeth 130. Engagement member 90 is movable between an engaged position as shown in FIG. 8, and a disengaged position as shown in FIG. 10.

Referring to FIGS. 2 and 8, actuator 98 includes a head 130 and a pair of spaced apart parallel legs 134 that extend from opposite sides of head 132. A cross member 136 spans between legs 134. Each leg 134 defines an opening 138 at its lower end, and pin 100 extends through the aligned openings 138 and openings 102 in ears 88, for pivotably mounting actuator 98 to and between ears 88. With this arrangement, engagement member 90 and actuator 98 are mounted between ears 88 for pivoting movement about offset pivot axes defined by pins 92, 100, respectively.

A torsion spring 140 is interposed between engagement member 90 and actuator 98. Torsion spring 140 includes coils that define a passage 142 through which pivot pin 100 extends. Torsion spring 140 includes a pair of spring ends 144 that are received within slots 146 formed in cross member 136. Between spring ends 144, torsion spring 140 defines an arm 148 that bears against a ramp surface 150 defined by engagement section 128 of engagement member 90.

Head 132 of actuator 98 is configured so as to enclose lever section 126 of engagement member 90. At its upper end, head 32 defines a recess 152 within which the upper end of engagement section 126 is received.

Opening 124 in cover 74 is configured so as to receive head 132 of actuator 98. In this manner, head 132 extends through opening 124 such that an outwardly facing engagement surface of head 132, shown at 154, is accessible from the exterior of cover 74.

Torsion spring 140 functions to bear between engagement section 128 of engagement member 90 and cross member 136 of actuator 98. Torsion spring 140 is engaged with engagement member 90 at a location below the pivot axis of engagement member 90 defined by pivot pin 92, and is engaged with actuator 98 at a location above the pivot axis of actuator 98 defined by pivot pin 100. Torsion spring 140 is operable to urge engagement section 128 of engagement member 90 and actuator 98 apart from each other, such that both engagement member 90 and actuator 98 are biased in a clockwise direction with reference to FIGS. 8, 10 and 11.

Referring to FIGS. 2 and 6, interlock member 104 includes a mounting section 156 within which a lower opening 158 is formed. Pivot pin 100 extends through lower opening 158, as well as through openings 102 in ears 88 and aligned openings 138 in actuator legs 134 and passage 142 defined by torsion spring 140. In addition, mounting section 156 of interlock member 104 includes an upper opening 160. The facing surface of actuator leg 138 is formed with an opening in alignment with opening 160 in mounting member 156, and a rivet 162 extends through opening 160 and the aligned opening in actuator leg 134, so as to mount interlock member 104 to actuator 98 such that interlock member 104 forms an extension of actuator 98.

Interlock member 104 includes an axially extending arm 163 having an outwardly extending tab 164 extending from its lower end. Tab 164 is configured so as to be slightly offset from arm 162, and extends at an acute angle relative to the longitudinal axis of arm 162. As shown in FIG. 7, tab 164 extends through an opening 165 formed in rear wall 80 of insert 72. Bearing member 106 includes a projection 167 configured to fit within opening 165, and a passage 169 is formed in projection 167 for enabling tab 164 to extend rearwardly of bearing member 106.

Referring to FIGS. 3 and 8, outer section 64 of stabilizing arm 40 includes an axially extending main section 168 and a hook-shaped wheel engaging section 170 located at the outer end of main section 168. Outer section 168 is formed of any satisfactory material, such as bent elliptical tubing, formed such that main section 168 extends along a longitudinal axis and wheel-engaging section 170 is formed to define an inner portion 172 which extends rearwardly at an angle relative to main section 168, and an outer portion 174 which extends substantially perpendicularly relative to inner portion 172. A wheel engagement area 176 is defined at the intersection of inner portion 172 and outer portion 174.

The outer surface main section 134 is formed with a series of teeth 178 in a manner as is known. Teeth 130 formed at the end of engagement section 128 of engagement member 90 are configured so as to be engageable with teeth 178 of main section 134, in a manner as is known.

An end cap 180 is engaged with the lower end of main section 168. End cap 180 includes a beveled downwardly facing surface 182 and an engagement member 184 which extends outwardly through an opening formed in the rear wall of main section 168. Engagement member 184 is formed on a tongue defined by end cap 180, which enables engagement member 184 to be depressed when end cap 180 is engaged with the end of arm main section 168, and to snap into the opening in the rear wall of main section 168 so as to maintain end cap 180 in engagement with main section 168.

In operation, stabilizing arm 40 functions as follows to maintain bicycle 24 in an upright position. Initially, stabilizing arm 40 is placed in a stowed position, such as shown in FIG. 4. In the stowed position, tab 164 of interlock member 104 is engaged within slot 72a in hub ring 68. This functions to place interlock member 104 in an interlock position such as shown in FIG. 6, which results in positioning of engagement member 90 in its engaged position as shown in FIG. 8. When engagement member 90 is in its engaged position, teeth 130 of engagement section 128 are engaged with teeth 178 of arm main section 178, to prevent extension of stabilizer outer section 168 relative to inner section 62. In order to engage stabilizing arm 40 with bicycle 24, the user depresses actuator 98 by application of an inward manual force on engagement surface 154, which disengages teeth 130 of engagement member 90 from teeth 178 and moves tab 164 out of slot 72a to place interlock member 104 in a release position, as shown in FIG. 10. The user then pivots stabilizing arm 40 upwardly about the pivot axis defined by pivot bolt 78. As soon as stabilizing arm 40 is pivoted away from the stowed position as shown in phantom in FIG. 4, the user releases engagement of actuator 98. When this occurs, the biasing force of torsion spring 140 urges actuator 98 and engagement member 90 in a clockwise direction. Disengagement of interlock member tab 164 from slot 72a enables pivoting movement of stabilizing arm 40 about the pivot axis defined by pivot bolt 78. During such pivoting movement of stabilizing arm 40, interlock member 104 is maintained in the release position via engagement of tab 164 with ring 68. The biasing force of torsion spring 140 causes the end of tab 164 to ride along the surface of ring 168. When stabilizing arm 40 reaches an operative position, such as a raised position as shown in FIGS. 1, 4 and 5, the biasing force of torsion spring 140 functions to move interlock member 104 to an interlock position, in which tab 164 of interlock member 104 is moved into slot 70a formed in ring 68 to prevent further rotation of stabilizing arm 40. The engagement of tab 164 within slot 70a in this manner produces both an audible clicking sound as well as a tactile feel, which provides the user with a sensory indication that stabilizing arm 40 is in an operative position. Such movement of tab 64 into slot 70a functions to bias engagement member 90 toward the engaged position, illustrated at arrow 178 in FIG. 11. The user then moves outer section 64 of stabilizing arm 40 downwardly into inner section 62, to bring wheel engagement area 176 into engagement with the upper area of wheel 26. Outer section 64 is moved inwardly or retracted in this manner by ratcheting engagement of teeth 178 with teeth 130 of engagement member 90, against the force of torsion spring 140. When outer section 168 is retracted to a desired position, i.e. engaged with bicycle wheel 26 with sufficient force to maintain bicycle 24 upright, further retraction of outer section 168 is prevented and engagement of teeth 130 of engagement member 90 with teeth 178 of outer section 168 functions to prevent extension of outer section 64. In this manner, stabilizing arm 40 is engaged with wheel 26 in a clamp-type manner, and functions to maintain bicycle 24 upright during transport.

When it is desired to remove bicycle 24, the user repeats and reverses the steps as set forth above, depressing actuator 98 to simultaneously move engagement member 90 from the engaged position to the disengaged position of FIG. 10 and to move interlock member 104 from the interlock position of FIG. 6 (in solid lines) to the release position of FIG. 6 (in phantom). The user then extends outer section 64 relative to inner section 62 out of engagement with bicycle wheel 26. Stabilizing arm 40 is then moved to the lowered, stowed position, where tab 164 of interlock member 104 is urged into slot 72a, to return interlock member 104 to the interlock position and engagement member 90 to the engaged position. When stabilizing arm 40 is stowed in this manner, extension of outer section 64 is prevented by engagement of teeth 130 of engagement member 90 with teeth 178 of outer section 64.

Slot 74a is located slightly below slot 72a, and provides a failsafe stop position for ensuring that stabilizing arm 40 cannot be lowered to a position which would result in outer section 64 falling out of inner section 62 by gravity.

The mirror image slots 70b, 72b and 74b are provided for manufacturing efficiency, so as to allow hub 60 to be mounted in either a right hand, left hand, forwardly or rearwardly facing orientation relative to cross member 34.

While the invention has been shown and described with respect to a specific embodiment, it is understood that alternatives and modifications are contemplated as being within the scope of the present invention. For example, and without limitation, while stabilizer 40 is shown as being engaged with wheel 26, it is understood that stabilizer 40 may be employed to engage any other part of bicycle 24 above engagement of the bicycle wheels with the wheel supports, e.g. the bicycle frame. Further, it is understood that interaction of interlock member 104 with the slots in ring 68 is representative of different types of mechanisms that may be employed to maintain engagement member 90 in the disengaged position at all times when stabilizer 40 is in a position other than an operative raised position or a stowed position, as shown.

Various alternatives and embodiments are contemplated as being within the scope of the following claims particularly pointing out and distinctly claiming the subject matter regarded as the invention.

I claim:

1. A stabilizer for a vehicle-mounted bicycle carrier having a frame, comprising:
   an inner section rotatably mounted to the frame for movement throughout a range of rotational positions relative to the frame, wherein the rotational positions of the inner section include one or more operative positions, wherein each of the operative positions corresponds to a predetermined angular position of the inner section relative to the frame, and wherein the inner section is in an inoperative position when the inner section is not in one of the operative positions;
   an outer section movably mounted to the inner section for movement between an extended position and a retracted position;
   a releasable engagement arrangement interposed between the inner section and the outer section for selectively maintaining the outer section in position relative to the inner section, wherein the releasable engagement arrangement includes an engagement member that is movable between an engaged position into engagement with the outer section to prevent movement of the outer section relative to the inner section, and a release position out of engagement with the outer section to allow movement of the outer section relative to the inner section; and a rotational position dependent interlock arrangement interconnected between the inner section and the releasable engagement arrangement, wherein the interlock arrangement includes interlock structure that is configured and arranged to maintain the engagement member of the releasable engagement arrangement in the release position when the inner section is in an inoperative position, and is further configured and arranged to enable movement of the engagement member of the releasable engagement arrangement to the engaged position when the inner section is rotated from an inoperative position to one of the operative positions.

2. The stabilizer of claim 1, wherein the releasable engagement arrangement comprises a series of teeth associated with one of the inner and outer sections and wherein the engagement member is mounted to the other of the inner and outer sections for movement between the engaged position and the release position, wherein the engagement member is configured to engage the teeth when in the engaged position to maintain the position of the outer section relative to the inner section.

3. A stabilizer for a vehicle-mounted bicycle carrier having a frame, comprising:

an inner section rotatably mounted to the frame for movement throughout a range of positions including one or more operative positions;

an outer section movably mounted to the inner section for movement between an extended position and a retracted position;

a releasable engagement arrangement interposed between the inner section and the outer section for selectively maintaining the outer section in position relative to the inner section, wherein the releasable engagement arrangement includes an engagement member that is movable between an engaged position and a release position, wherein the releasable engagement arrangement comprises a series of teeth associated with one of the inner and outer sections and wherein the engagement member is mounted to the other of the inner and outer sections for movement between the engaged position and the release position, wherein the engagement member is configured to engage the teeth when in the engaged position to maintain the position of the outer section relative to the inner section, wherein the releasable engagement arrangement includes a biasing arrangement interconnected with the engagement member for biasing the engagement member toward the engaged position; and an interlock arrangement interconnected between the inner section and the releasable engagement arrangement, wherein the interlock arrangement is configured and arranged to maintain the engagement member of the releasable engagement arrangement in the release position when the inner section is not in the one or more operative positions, and to enable movement of the engagement member of the releasable engagement arrangement to the engaged position when the inner section is in one of the operative positions, and wherein the interlock arrangement is operable to maintain the engagement arrangement in the release position against a biasing force provided by the biasing arrangement when the inner section is not in one of the operative positions.

4. The stabilizer of claim 3, wherein the interlock arrangement is operable to prevent pivoting movement of the inner section away from the operative position when the engagement member is in the engaged position, and wherein the releasable engagement arrangement further includes a manually operable actuator interconnected with the engagement member for moving the engagement member away from the engaged position against the biasing force to enable pivoting movement of the inner section of the stabilizer.

5. The stabilizer of claim 4, wherein the interlock arrangement includes a biased interlock member that is movable between an interlock engaged position for preventing pivoting movement of the inner section of the stabilizer and an interlock release position for enabling pivoting movement of the inner section of the stabilizer, and interlock engagement structure configured to engage the interlock member when the inner section of the stabilizer is not in one of the operative positions to maintain the interlock member in the interlock release position against the biasing force.

6. The stabilizer of claim 5, wherein the interlock member is biased toward the interlock engaged position by the biasing arrangement that biases the engagement member toward the engaged position, wherein the interlock engagement structure is operable to maintain both the interlock member in the interlock release position and the engagement member in the release position when the inner section of the stabilizer is not in one of the operative positions.

7. The stabilizer of claim 5, wherein the interlock engagement structure comprises an arcuate engagement surface offset from a pivot axis about which the inner section of the stabilizer is pivotable, wherein the arcuate engagement surface is configured to engage the interlock member during pivoting movement of the inner section of the stabilizer when the inner section of the stabilizer is not in one of the engaged positions so as to maintain the interlock member in the interlock release position, and wherein the arcuate engagement surface includes one or more openings configured to receive the interlock member to enable movement of the interlock member toward the interlock engaged position under the influence of the biasing force when the stabilizer is in one of the operative positions, and wherein engagement of the interlock member within one of the openings prevents pivoting movement of the inner section of the stabilizer away from the operative position.

8. A bicycle carrier, comprising:

a frame;

a wheel support interconnected with the frame and configured to engage a lower area of a bicycle wheel; and a pivotable stabilizer configured to engage an upper area of the bicycle, wherein the stabilizer includes an inner section that is pivotably mounted to the frame for movement throughout a range of pivoted positions relative to the frame, wherein the pivoted positions of the inner section include one or more operative positions, wherein each of the operative positions corresponds to a predetermined angular position of the inner section relative to the frame, and wherein the inner section is in an inoperative position when the inner section is not in one of the operative positions; an outer section movably mounted to the inner section for movement between an extended position and a retracted position; engagement structure interposed between the inner section and the outer section and including a movable engagement member movable between an engaged position into engagement with the outer section to prevent movement of the outer section relative to the inner section and a disengaged position out of engagement with the outer section to allow movement of the outer section relative to the inner section; and pivot position dependent selectively actuable control structure interconnected with the movable engagement member, wherein the selectively actuable control structure includes a control member that is configured and arranged to maintains the movable engagement member in the disengaged position when the stabilizer is in an inoperative position, and wherein the control member moves the engagement member to the engaged position when the stabilizer is pivoted from an inoperative position to one of the operative positions.

9. A bicycle carrier, comprising:
a wheel support configured to engage a lower area of a bicycle wheel; and
a pivotable stabilizer configured to engage an upper area of the bicycle, wherein the stabilizer includes a pivoting inner section; an outer section movably mounted to the inner section for movement between an extended position and a retracted position; engagement structure interposed between the inner section and the outer section and including a movable engagement member movable between an engaged position and a disengaged position; and a selectively actuable control structure interconnected with the movable engagement member, wherein the selectively actuable control structure is operable to maintain the movable engagement member in the disengaged position when the stabilizer is in an inoperative position relative to the wheel support, and to move the engagement member to the engaged position when the stabilizer is in an operative position relative to the wheel support, wherein the inner section of the stabilizer is pivotable about a pivot axis, and wherein the control structure includes a biased control member offset from the pivot axis that is movable between an interlock position and a release position, and means for maintaining the control member in the release position when the stabilizer is not in an operative position relative to the wheel support.

10. The bicycle carrier of claim 9, wherein the means for maintaining the control member in the release position comprises an arcuate surface offset from the pivot axis, wherein the biased control member is biased toward the arcuate surface and wherein the arcuate surface is configured to engage the control member when the stabilizer is not in an operative position to maintain the control member in the release position.

11. The bicycle carrier of claim 10, wherein the arcuate surface includes one or more openings, wherein each of the one or more openings is positioned so as to enable movement of the control member to the interlock position when the stabilizer is in an operative position to prevent pivoting movement of the stabilizer and to enable movement of the engagement member to the engaged position.

12. The bicycle carrier of claim 11, further comprising biasing means for biasing the engagement member toward the engaged position and for biasing the control member toward the interlock position.

13. The bicycle carrier of claim 11, wherein the biasing means comprises a torsion spring interconnected with both the engagement member and the control member.

14. The bicycle carrier of claim 9, further comprising manually operable actuator means configured to move the engagement member to the disengaged position and the control member to the release position when the stabilizer is in an operative position, so as to enable movement of the stabilizer away from the operative position.

15. The bicycle carrier of claim 14, wherein the manually operable actuator means comprises a pivotable actuator member configured to engage the engagement member when the engagement member is in the engaged position so as to move the engagement member to the disengaged position, and wherein the control member is interconnected with the engagement member such that movement of the engagement member to the disengaged position causes movement of the control member to the release position.

16. A method of operating a bicycle carrier having a frame and a wheel support for supporting a lower area of a bicycle wheel, and a stabilizer engageable with an upper area of the bicycle, wherein the stabilizer includes a pivotable inner section and an outer section that is extendible and retractable relative to the inner section, and wherein the stabilizer further includes a releasable engagement arrangement between the inner section and the outer section, comprising the steps of:
pivoting the inner section of the stabilizer throughout a range of positions relative to the frame, wherein the range of positions includes one or more operative positions, each of which corresponds to a predetermined angular position of the inner section relative to the frame, and wherein the range of positions further includes inoperative positions when the inner section of the stabilizer is not in one of the operative positions;
enabling operation of the releasable engagement arrangement when the inner section of the stabilizer is pivoted from an inoperative position to one of the operative positions, wherein the releasable engagement arrangement is operable to selectively fix the position of the outer section of the stabilizer relative to the inner section when the inner section of the stabilizer is in one of the operative positions; and
disabling operation of the releasable engagement arrangement when the inner section of the stabilizer is in an inoperative positions, wherein the releasable engagement arrangement is incapable of fixing the position of the outer section of the stabilizer relative to the inner section when the inner sections is in an inoperative positions.

17. A method of operating a bicycle carrier having a wheel support for supporting a lower area of a bicycle wheel, and a stabilizer engageable with an upper area of the bicycle, wherein the stabilizer includes a pivotable inner section and an outer section that is extendible and retractable relative to the inner section, and wherein the stabilizer further includes a releasable engagement arrangement between the inner section and the outer section, comprising the steps of:
pivoting the inner section of the stabilizer throughout a range of positions including one or more operative positions;
enabling operation of the releasable engagement arrangement when the inner section of the stabilizer is pivoted to one of the operative positions, wherein the releasable engagement arrangement is operable to selectively fix the position of the outer section of the stabilizer relative to the inner section; and disabling operation of the releasable engagement arrangement when the inner section of the stabilizer is not in one of the operative positions, wherein the releasable engagement arrangement is incapable of fixing the position of the outer section of the stabilizer relative to the inner section;

wherein the steps of enabling and disabling operation of the releasable engagement arrangement are carried out by an interlock arrangement interconnected with the inner section of the stabilizer and with the releasable engagement arrangement.

18. The method of claim 17, wherein the releasable engagement arrangement includes an engagement member that is movable between an engaged position and a disengaged position, and wherein the interlock arrangement carries out the steps of enabling and disabling operation of the releasable engagement arrangement by placing the engagement member in the engaged position when the stabilizer is in one of the operative positions, and preventing movement of the engagement member to the engaged position when the stabilizer is not in one of the operative positions.

19. The method of claim 18, wherein the interlock arrangement includes an interlock member interconnected with the engagement member, wherein the interlock member is movable between an interlock position when the engagement member is in the engaged position and a release position when the engagement member is in the disengaged position, and wherein the interlock arrangement prevents movement of the engagement member to the engaged position by maintaining the interlock member in the release position when the stabilizer is not in one of the operative positions and moving the interlock member to the interlock position when the stabilizer is in one of the operative positions.

20. The method of claim 19, wherein the interlock member is movable to the release position and the engagement member is movable to the disengaged position in response to manual movement of an actuator interconnected with the interlock member and with the interlock member.

21. A bicycle carrier, comprising:
a wheel support configured to engage a lower area of a bicycle wheel;
a pivotable stabilizer movable throughout a range of pivot positions including at least one operative position that corresponds to a predetermined angular position of the stabilizer relative to the wheel support, wherein the stabilizer is in an inoperative position when the stabilizer is not in one of the operative positions, wherein the stabilizer is configured to engage an upper area of the bicycle and includes a pivoting inner section, an outer section that is extendible and retractable relative to the inner section, and engagement structure interposed between the inner section and the outer section and including a movable engagement member movable between an engaged position into engagement with the outer section for selectively fixing the position of the outer section relative to the inner section, and a disengaged position out of engagement with the outer section for enabling extension of the outer section relative to the inner section; and
pivot position dependent interlock means interconnected between the inner section and the releasable engagement arrangement for moving the engagement member toward the engaged position when the stabilizer is pivoted from an inoperative position to one of the operative positions, and for maintaining the engagement member in the disengaged position when the stabilizer is in an inoperative position.

22. A stabilizer for a vehicle-mounted bicycle carrier having a frame, comprising:
an inner section rotatably mounted to the frame for movement throughout a range of positions including one or more operative positions,
an outer section movably mounted to the inner section for movement between an extended position and a retracted position;
a releasable engagement arrangement interposed between the inner section and the outer section for selectively maintaining the outer section in position relative to the inner section, wherein the releasable engagement arrangement includes:
an engagement member that is movable between an engaged position and a release position;
a series of teeth associated with one of the inner and outer sections, wherein the engagement member is mounted to the other of the inner and outer sections for movement between the engaged position and the release position, wherein the engagement member is configured to engage the teeth when in the engaged position to maintain the position of the outer section relative to the inner section; and
a biasing arrangement interconnected with the engagement member for biasing the engagement member toward the engaged position; and
a position dependent interlock arrangement interconnected between the inner section and the releasable engagement arrangement, wherein the interlock arrangement includes interlock structure that maintains the engagement member of the releasable engagement arrangement in the release position when the inner section is not in the one or more operative positions, and that enables movement of the engagement member of the releasable engagement arrangement to the engaged position when the inner section is in one of the operative positions, and wherein the interlock arrangement is operable to maintain the engagement arrangement in the release position against a biasing force provided by the biasing arrangement when the inner section is not in one of the operative positions.

23. The stabilizer of claim 22, wherein the interlock arrangement is operable to prevent pivoting movement of the inner section away from the operative position when the engagement member is in the engaged position, and wherein the releasable engagement arrangement further includes a manually operable actuator interconnected with the engagement member for moving the engagement member away from the engaged position against the biasing force to enable pivoting movement of the inner section of the stabilizer.

24. The stabilizer of claim 23, wherein the interlock structure includes a biased interlock member that is movable between an interlock engaged position for preventing pivoting movement of the inner section of the stabilizer and an interlock release position for enabling pivoting movement of the inner section of the stabilizer, and interlock engagement structure configured to engage the interlock member when the inner section of the stabilizer is not in one of the operative positions to maintain the interlock member in the interlock release position against the bias.

25. The stabilizer of claim 24, wherein the interlock member is biased toward the interlock engaged position by the biasing arrangement that biases the engagement member toward the engaged position, wherein the interlock engagement structure is operable to maintain both the interlock member in the interlock release position and the engagement member in the release position when the inner section of the stabilizer is not in one of the operative positions.

26. The stabilizer of claim 25, wherein the interlock engagement structure comprises an arcuate engagement surface offset from a pivot axis about which the inner section of the stabilizer is pivotable, wherein the arcuate engagement surface is configured to engage the interlock member during pivoting movement of the inner section of the stabilizer when the inner section of the stabilizer is not in one of the engaged positions so as to maintain the interlock member in the interlock release position, and wherein the arcuate engagement surface includes one or more openings configured to receive the interlock member to enable movement of the interlock member toward the interlock engaged position under the influence of the bias when the stabilizer is in one of the operative positions, and wherein engagement of the interlock member within one of the openings prevents pivoting movement of the inner section of the stabilizer away from the operative position.

* * * * *

UNITED STATES PATENT AND TRADEMARK OFFICE
CERTIFICATE OF CORRECTION

PATENT NO. : 7,044,347 B1
APPLICATION NO. : 10/383013
DATED : May 16, 2006
INVENTOR(S) : Fabio Pedrini It is certified that error appears in the above-identified patent and that said Letters Patent is hereby corrected as shown below:

IN THE CLAIMS

CLAIM 8, column 11, line 13, delete "maintains" and substitute therefore -- maintain --;

CLAIM 16, column 12, line 46, delete "positions" and substitute therefore -- position --;

CLAIM 16, column 12, line 49, delete "sections" and substitute therefore -- section --;

CLAIM 16, column 12, line 50, delete "positions" and substitute therefore -- position --;

CLAIM 20, column 13, line 39, delete "interlock" (2nd occurrence) and substitute therefore -- engagement --.

Signed and Sealed this

First Day of August, 2006

JON W. DUDAS
*Director of the United States Patent and Trademark Office*